United States Patent
Teshima et al.

(10) Patent No.: US 7,305,284 B2
(45) Date of Patent: Dec. 4, 2007

(54) REMOTE CONTROL SYSTEM AND METHOD FOR VEHICLE

(75) Inventors: Kentaro Teshima, Kariya (JP); Haruyuki Tsuzuki, Toyota (JP)

(73) Assignee: DENSO CORPORATION, Kariya (JP)

( * ) Notice: Subject to any disclaimer, the term of this patent is extended or adjusted under 35 U.S.C. 154(b) by 338 days.

(21) Appl. No.: 11/178,302

(22) Filed: Jul. 12, 2005

(65) Prior Publication Data

US 2006/0030268 A1 Feb. 9, 2006

(30) Foreign Application Priority Data

Aug. 4, 2004 (JP) ............................. 2004-228405

(51) Int. Cl.
*G06F 19/00* (2006.01)
(52) U.S. Cl. .................... 701/2; 701/49; 307/10.3; 340/426.13; 340/426.16; 340/426.28
(58) Field of Classification Search ................ 701/1, 701/2, 36, 49; 307/10.1, 10.2, 10.3, 10.5; 340/426.13, 426.14, 426.15, 426.16, 426.17, 340/426.28, 426.3, 426.31
See application file for complete search history.

(56) References Cited

U.S. PATENT DOCUMENTS 5,563,453 A * 10/1996 Nyfelt ...................... 307/10.2
5,602,535 A * 2/1997 Boyles et al. ............... 340/5.22
5,619,191 A * 4/1997 Lambropoulos et al. ... 340/5.22
5,896,094 A * 4/1999 Narisada et al. ........... 340/5.64
6,744,364 B2 * 6/2004 Wathen .................... 340/539.1
2006/0132325 A1* 6/2006 Fujii et al. ............. 340/825.69

FOREIGN PATENT DOCUMENTS

| JP | A-2002-47835 | 2/2002 |
| JP | 2004-27490 | 1/2004 |

* cited by examiner

*Primary Examiner*—Gary Chin
(74) *Attorney, Agent, or Firm*—Posz Law Group, PLC (57) ABSTRACT

A vehicle has a reference receiver installed at an outer edge position of a desired detection area in a compartment to receive a signal transmitted from a transmitter in the compartment. The level of signal transmission output of the transmitter is adjusted based on the reception result of the reference receiver. It becomes possible to adjust the signal transmission output of the transmitter in the compartment so as to obtain a desired detection area at all times irrespective of change of the detection area reached by the request signal from the transmitter determined by the compartment or irrespective of variation in the electromagnetic wave environment in which the vehicle is placed.

10 Claims, 6 Drawing Sheets

REMOTE CONTROL SYSTEM AND METHOD FOR VEHICLE

CROSS REFERENCE TO RELATED APPLICATION

This application is based on and incorporates herein by reference Japanese Patent Application No. 2004-228405 filed on Aug. 4, 2004.

FIELD OF THE INVENTION

The present invention relates to a remote control system and method for remotely controlling operations of vehicle-mounted equipment based on bidirectional communications between a vehicle-mounted unit and a portable device carried by a vehicle user.

BACKGROUND OF THE INVENTION

As a system for remotely controlling vehicle-mounted equipment, an electronic key system is proposed. This system operates to change over the locked state and the unlocked state of vehicle doors based on the result of collating the ID codes accomplished by the bidirectional communication between a portable electronic key (portable device) carried by a vehicle user and a unit mounted on the vehicle. This system resets a steering lock and permits an engine to be started when the user holding the electronic key is inside the vehicle compartment.

The unit mounted in the vehicle of the electronic key system includes an exterior transmitter provided outside the vehicle compartment to transmits a request signal, an interior transmitter provided inside the vehicle compartment to transmit the request signal, a receiver that receives a response signal from the electronic key, and an ECU that controls vehicle-mounted equipment such as doors based on the results transmitted to, and received from, the electronic key. The exterior transmitter and the interior transmitter transmit the request signals maintaining a predetermined electric transmission output power. Therefore, an area for detecting the electronic key is established in a range reached by signals from the exterior transmitter and the interior transmitter. This makes it possible to monitor a user holding the electronic key who approaches the vehicle, who gets in the vehicle or who gets off the vehicle.

For example, if the user holding the electronic key who is going to get in the vehicle approaches the vehicle and enters into the detection area, the electronic key transmits a response signal including an ID code to the vehicle-mounted unit in response to the request signal. When it is determined that a predetermined relationship is satisfied, such as the ID code in the response signal from the electronic key is in agreement with the registered ID code, the vehicle-mounted unit transmits a control signal to a door lock control unit which is vehicle-mounted equipment to place the doors in an unlock standby state. When the user holding the electronic key touches the door handle in this state, the door lock control unit detects it through a touch sensor and unlocks the doors.

When the user holding the electronic key gets in the vehicle causing the electronic key detection area to be shifted into the interior of the compartment from the exterior of the compartment, the vehicle-mounted unit works to control the vehicle-mounted equipment, such as resetting the steering lock and permitting the engine to be started based on the collated result of ID codes.

When the user holding the electronic key gets off the vehicle after having stopped the engine of the vehicle, the electronic key detection area shifts to the exterior of the compartment from the interior of the compartment. In this case, when, for example, a door lock switch provided near the door handle is operated, the vehicle-mounted unit so instructs the door lock control unit as to lock the doors. However, when the electronic key detection area remains interior even if the door lock switch is operated, the vehicle-mounted unit inhibits the door lock control units from locking the doors to prevent the key from being locked interior.

In the above electronic key system, a variety of controls are executed depending upon whether the electronic key detection area is interior or exterior. Therefore, the detection areas of the exterior transmitter and of the interior transmitter must be properly set.

In particular, when the detection area inside the vehicle is narrow and does not cover the entire compartment, it may happen that the electronic key is not detected interior even if the electronic key, in practice, is interior. In this case, it may happen that the steering lock of the vehicle is not reset or the engine is not started. Conversely, when the detection area inside the vehicle is too broad covering even the exterior of the compartment, it may happen that the doors are not locked even if the user holding the electronic key who is off the vehicle to lock the doors.

Therefore an electric current flowing into the antenna of the transmitter may be adjusted by varying the resistance of a current-limiting resistor for each of the models of vehicles in the stage of developing the vehicle. The signal transmission output of the interior transmitter is thus adjusted to obtain a desirable detection area.

Even if the signal transmission output is adjusted for each of the models of vehicles, however, the detection area may often vary depending upon the individual vehicles. The conventional method is not capable of coping with the variation for each of the vehicles.

Further, the expansion of the detection area varies depending upon the electromagnetic wave environment in which the vehicle is placed. The conventional method is not capable of coping with the variation in the expansion of the detection area that is dependent upon the electromagnetic wave environment.

SUMMARY OF THE INVENTION

The present invention has an object of providing a remote control system and method for a vehicle, enabling a portable device detection area to be suitably set by an interior transmitter.

According to the present invention, a transmitter provided in a vehicle transmits a request signal into a compartment of the vehicle to be received by a portable device carried by a user. The user is allowed to operate the vehicle when a response signal is received from the portable device in response to the request signal. The transmitter further transmits a predetermined signal into the compartment to be received by a reference receiver provided in the vehicle. A signal output level of the transmitter is changed based on a state of reception of the predetermined signal by the reference receiver so that the signal output level of the transmitter is adjusted to generally correspond to a compartment of the vehicle.

Preferably, after the user stopped operating the vehicle, the transmitter transmits the predetermined signal and the signal output level of the transmitter is changed. The reference receiver is positioned at generally an outermost position of the compartment.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

A system and method for remotely operating vehicle-mounted equipment will now be described with reference to various embodiments. The system for remotely operating vehicle-mounted equipment is constructed as an electronic key system, which, however, can further be applied to remotely operating other vehicle-mounted equipment.

First Embodiment

Figure 1:
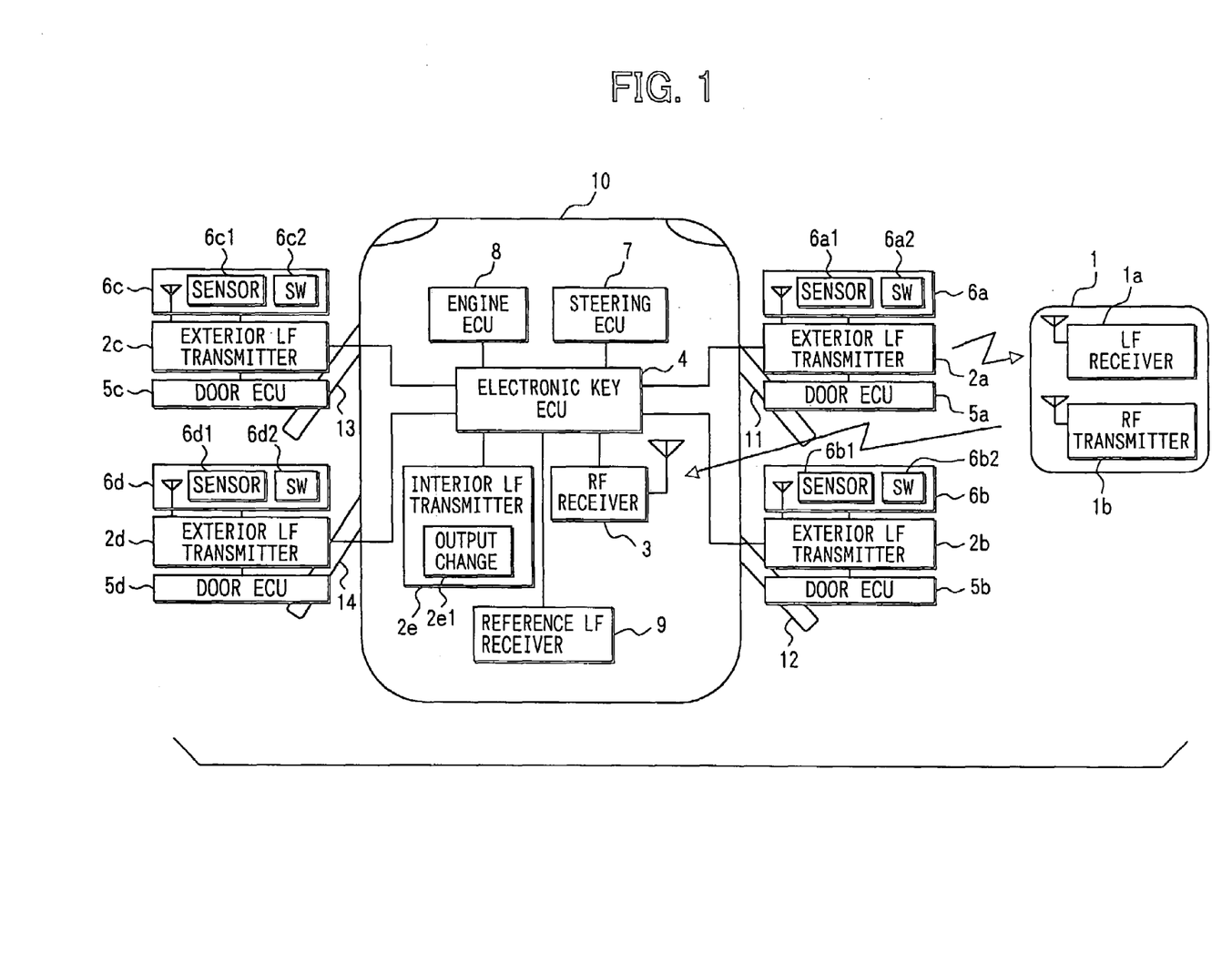
FIG. 1 is a block diagram illustrating an electronic key system according to a first embodiment of the present invention.

Referring first to FIG. 1, an electronic key system is constructed so that an electronic key ECU 4 which is one of units on the side of a vehicle 10 controls the locked/unlocked state of doors based on the result of collating ID codes accomplished by the bidirectional communication between the potable device (electronic key) 1 and a vehicle-mounted unit. In order to improve the security of the vehicle 10, further, the electronic key ECU 4 controls the steering locking state as well as the state of permitting/inhibiting the start of an engine of the vehicle 10.

In the vehicle 10, doors 11 to 14 are provided with exterior LF (low frequency) transmitters 2a to 2d, while an interior LF transmitter 2e is provided inside a vehicle compartment. The exterior transmitters 2a to 2d and the interior transmitter 2e transmit a request signal (query signal) in response to an instruction signal from the electronic key ECU 4. When the vehicle 10 is parking with its engine stopped and the doors 11 to 14 locked, the electronic key ECU 4 instructs the exterior transmitters 2a to 2d to transmit request signals periodically. Further, when the door 11 of the driver's seat is opened or closed, when the engine is started and when the doors are locked by operating door lock switches, the electronic key ECU 4 instructs the interior transmitter 2e to transmit the request signal.

The exterior LF transmitters 2a to 2d and the interior LF transmitter 2e are each constructed with a code generating circuit for generating a request signal code representing a request signal and a code that differs depending upon the transmitters, a clock generating circuit for generating clock signals of a predetermined low frequency, and a modulator circuit that modulates the code by using the clock signals and forms a modulated code signal. Namely, the request signal comprises a modulated code signal modulated by clock signals of a predetermined low frequency.

The signal transmission output is so adjusted in advance that the distance which the request signals transmitted from the exterior transmitters 2a to 2d reach is, for example, about 0.7 to 1.0 m. When the vehicle 10 is parking, therefore, the detection areas are established around the doors 11 to 14 of the vehicle 10 depending upon the distances reached by the request signals, to detect a user holding the portable device 1 who has approached the vehicle 10.

The interior LF transmitter 2e, on the other hand, has an output change circuit unit 2e1 capable of changing the signal transmission output. The output change circuit unit 2e1 comprises, for example, a voltage change circuit which varies the voltage applied for supplying a current to an antenna at the time when the request signal is transmitted from the interior LF transmitter 2e. Therefore, the distance reached by the request signal transmitted from the interior transmitter 2e varies, making it possible to adjust the expansion of the detection area inside the vehicle. In this embodiment, further, the signal transmission output of the interior LF transmitter 2e is adjusted to a plurality of levels through the output change circuit unit 2e1.

The vehicle 10 is equipped with a reference LF receiver 9 for receiving the request signal or an area adjusting signal transmitted from the interior LF transmitter 2e. As is well known, the reference LF receiver 9 includes signal-receiving circuits such as an amplifier circuit and a demodulator circuit. The receiver 9 sends the result of having received the signal of the signal-receiving circuits into the electronic key ECU 4 through a connection line. The LF receiver 9 inside the compartment is installed at a position near the outer edge of a desired detection area of the LF transmitter 2e in the compartment. By adjusting the transmission signal output of the LF transmitter 2e in the compartment based on the state of receiving the signal by the LF receiver 9, therefore, the detection area of the LF transmitter 2e in the compartment can be adjusted to accomplish a desired detection area.

The portable device 1 includes an LF receiver unit 1a for receiving the request signals from the exterior transmitter 2a to 2d or from the interior transmitter 2e, an RF transmitter unit 1b for transmitting a response signal inclusive of the ID code in response to the receipt of the request signals, and, though not shown, a control unit for controlling operations of the LF receiver unit 1a and the RF transmitter unit 1b. The portable device 1 transmits, as a response signal, a code signal modulated by clock signals of a predetermined high-frequency (radio-frequency RF) band.

The vehicle 10 is provided with only one RF receiver 3 for receiving a response signal from the portable device 1. The response signal received by the receiver 3 is sent as a received signal to the electronic key ECU 4.

The communication between the portable device 1 and the exterior transmitters 2a to 2d or the interior transmitter 2e is attained as follows in a case where the portable device 1 communicates with the exterior transmitter 2a.

Before the start of communication, the LF receiver unit 1a and the RF transmitter unit 1b in the portable device 1 are in a sleep state. Therefore, the exterior transmitter 2a transmits a first request signal for waking up the LF receiver unit 1a and the RF transmitter unit 1b in the portable device 1. The portable device 1 wakes up due to the first request signal and sends back an acknowledge signal (ACK signal) as a first response signal. When the ACK signal is received by the RF receiver 3, the exterior transmitter 2a transmits, as the second request signal, a signal including a vehicle ID code which is specific to each vehicle. When the vehicle ID code same as the vehicle ID code that is transmitted is received, the portable device 1 sends back the ACK signal again as a second response signal.

When the RF receiver 3 receives the ACK signal for the vehicle ID code, the exterior transmitter 2a transmits, as a third request signal, a signal including a code that differs depending upon the transmitters. By utilizing a code included in this signal, the portable device 1 prepares a response code, and transmits it as a third response signal together with its own ID code. When no ACK signal is returned back from the portable device 1 despite the first and second request signals are transmitted from the exterior transmitter 2a, it is so regarded that no portable device 1 exists in the detection area, and the communication ends.

As described above, the response code is prepared by utilizing a code that differs depending upon the transmitters. Therefore, the electronic key ECU 4 is allowed to detect, from the response code in the third response signal, the transmitter that has transmitted the request signal, responsive to which the portable device 1 has transmitted the response signal. The electronic key ECU 4 further determines whether a predetermined relationship is satisfied, such as whether the ID code included in the third response signal is in agreement with the ID code that has been registered in advance (collation of ID codes). After having determined that the predetermined relationship is satisfied by the received ID code and the registered ID code (collation of the ID codes is OK), the electronic key ECU 4 controls the operation of the vehicle-mounted equipment such as doors, steering wheels, engine, etc.

The doors 11 to 14 of the vehicle 10 are provided with door ECUs 5a to 5d which lock or unlock the doors 11 to 14, or set an unlock standby state in which the doors that have been locked can be unlocked as the user holding the portable device 1 touches the exterior outside-the-door handle (door handle). The door ECUs 5a to 5d work in response to an instruction signal from the electronic key ECU 4.

That is, after having determined that a predetermined relationship is satisfied by the received ID code and the registered ID code (collation of the ID codes is OK), the electronic key ECU 4, first, determines the position of the user holding the portable device 1 from the response code. When the position of the user holding the portable device 1 is outside of the vehicle, the electronic key ECU 4 sends an instruction signal to the corresponding door ECUs 5a to 5d to set the door corresponding to the position to the unlock standby state. Therefore, any one of the door ECUs 5a to 5d that has received the instruction signal sets the corresponding door 11 to 14 to the unlock standby state.

When the position of the user holding the portable device 1 corresponds to, for example, the door 11 having the door ECU 5a, the door ECU 5a sets the door 11 to the unlock standby state. Here, the doors 12 to 14 corresponding to the door ECUs 5b to 5d other than the door ECU 5a, remain in the locked state.

The door handles 6a to 6d of the doors 11 to 14 of the vehicle 10 are equipped with touch sensors 6a1 to 6d1 to detect the door handle 6a to 6d touched by the user holding the portable device 1. Further, the door handles 6a to 6d are further provided with door lock switches 6a2 to 6d2 in the form of push switches. When the collation of the ID codes has been finished, the doors 11 to 14 can be locked upon operating the door lock switches 6a2 to 6d2. The door handles 6a to 6d also play the role of antennas of the exterior transmitters 2a to 2d.

When it is detected by the touch sensor 6a1 to 6d1 that the door handle 6a to 6d is touched by the user holding the portable device 1 in a state where any one of the door ECU 5a to 5d has set the corresponding door 11 to 14 to the unlock standby state in response to the instruction signal from the electronic key ECU 4, the data thereof is transmitted to the electronic key ECU 4. The electronic key ECU 4 unlocks all of the doors 11 to 14. That is, when the user holding the portable device 1 tries to open the door, the doors 11 to 14 are all unlocked automatically.

Specifically, when it is detected that the touch sensor 6a1 provided in the door 11 is touched in a state where the door 11 is in the unlock standby state, the doors 11 to 14 are all unlocked. Here, when the door 11 is in the unlock standby state, other doors 12 to 14 remain in the locked state. Therefore, the doors 11 to 14 are not unlocked even if the touch sensors 6b1 to 6d1 are touched by other occupants who are not holding the portable device 1.

However, the attempt to open the door by the user holding the portable device 1 may, further, be detected by using a detection mechanism which mechanically detects the door handles 6a to 6d that are pulled forward instead of using the touch sensors 6a1 to 6d1. Moreover, the door handles may be provided with unlock buttons, and the attempt to open the door may be detected based on the operation of the unlock buttons. Further, all of the doors may be set to the unlock standby state when the collation of the ID codes turns out to be OK.

The electronic key system includes a steering lock ECU 7 and an engine ECU 8 for enhancing the security of the vehicle 10. These steering lock ECU 7 and the engine ECU 8, too, work to turn the steering lock on/off and to change over the permission/inhibition of start of the engine of the vehicle based on the instruction signals from the electronic key ECU 4.

That is, when the user holding the portable device 1 gets in the vehicle 10 by opening and closing the door, the electronic key ECU 4 executes the bidirectional communication relative to the portable device 1 by using the transmitter 2e and the receiver 3 provided in the compartment to collate the ID codes again. When the engine switch of the vehicle is operated, on the other hand, the electronic key ECU 4 makes sure if the steering lock ECU 7 may reset the steering lock. When the result of collating the ID codes turns out to be OK, the electronic key ECU 4 permits the steering lock ECU 7 to reset the steering lock; i.e., the steering lock ECU 7 unlocks the steering lock in response thereto. At this moment, the electronic key ECU 4, at the same time, produces an instruction signal to the engine ECU 8 to reset the inhibition of start of the engine. Thus, the user holding the portable device 1 is allowed to go on board by unlocking the door and to start the engine without really holding the portable device 1 by hand.

On the other hand, when the vehicle 10 is brought into a halt, the engine switch is turned off and the user holding the portable device 1 gets off the vehicle. When it is detected that any one of the door clock switches 6a2 to 6d2 provided in the door handles 6a to 6d is operated, the electronic key ECU 4 sends an instruction signal to the door ECUs 5a to 5d to lock the doors 11 to 14 of the vehicle. Simultaneously with the locking of the doors, the electronic key ECU 4 instructs the engine ECU 8 to set the engine to the start inhibited state.

The doors 11 to 14 may, further, be locked by the user holding the portable device 1 not based on the above door lock switches 6a2 to 6d2 but based on any other means such as providing touch sensors for locking the doors.

As described above, the electronic key system of this embodiment makes it possible to automatically lock/unlock the doors and to set/reset the security for the vehicle only if the user is holding the portable device 1.

Figure 2:
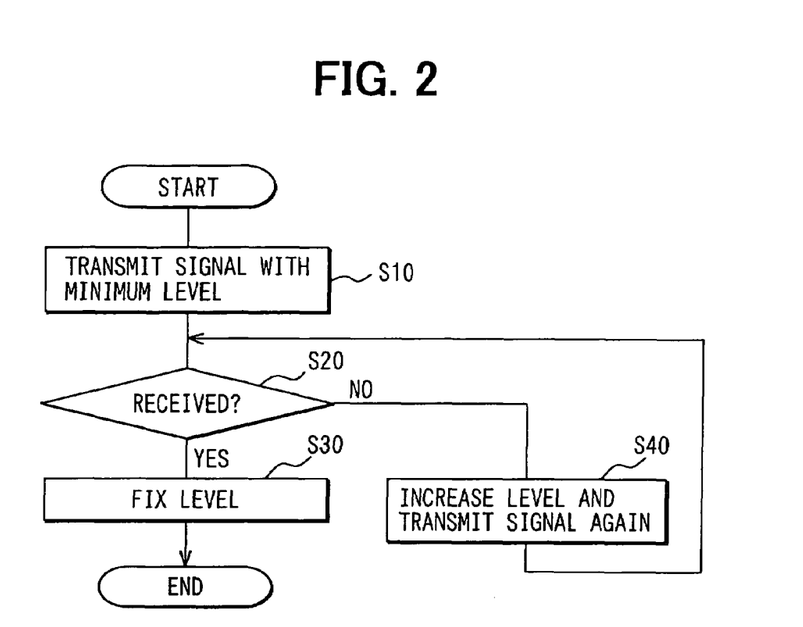
FIG. 2 is a flowchart illustrating a method of adjusting a signal transmission output of a LF transmitter provided inside a compartment in the first embodiment.

Next, a method of adjusting the signal transmission output of the interior LF transmitter 2e in the electronic key system of the above embodiment will be described based on a flowchart of FIG. 2. It is desired that the processing of the flowchart of FIG. 2 is executed before the user holding the portable device 1 gets in the vehicle causing the request signal to be transmitted to the portable device 1 from the interior LF transmitter 2e. If the signal transmission output has been adjusted in advance, the detection area is suitably established in the compartment, and the communication can be executed between the portable device 1 and the vehicle-mounted unit so far as the portable device 1 exists in the compartment. When the vehicle 10 is brought into a halt and the engine is stopped, further, it is desired that the processing of the flowchart of FIG. 2 is executed again. Even when the level of the signal transmission output of the interior LF transmitter 2e is once adjusted, the electromagnetic wave environment may vary if the vehicle travels. It is, therefore, desired to adjust the signal transmission output of the interior LF transmitter 2e again to cope with a change in the electromagnetic wave environment.

At step S10, first, a predetermined signal is transmitted by minimizing the signal transmission level of the interior LF transmitter 2e. The predetermined signal transmitted in this case may be a request signal output to the portable device 1 or may be an area-adjusting signal that is exclusively set for adjusting the signal transmission output of the interior LF transmitter 2e.

At step S20, the state of receiving the signal is determined by the reference LF receiver 9. Namely, the reference LF receiver 9 determines if a signal transmitted from the interior LF transmitter 2e is received. When it is determined that the signal is received, the routine proceeds to step S30 where the level of the signal transmission output of the interior LF transmitter 2e is fixed to the output level of that moment. On the other hand, when it is determined at step S20 that no signal is received, the routine proceeds to step S40 where the level of the signal transmission output of the interior LF transmitter 2e is increased by one step or unit, and the signal is transmitted from the interior LF transmitter 2e maintaining an output level that is increased by one step. The processing is executed at step S20 again. It is determined if the signal is now received as a result of increasing the output level by one step.

The signal transmission output of the interior LF transmitter 2e is thus adjusted to establish a suitable detection area in the compartment at all times without being affected by differences of the individual vehicles or by the electromagnetic wave environment in which the vehicle is placed.

Figure 4:
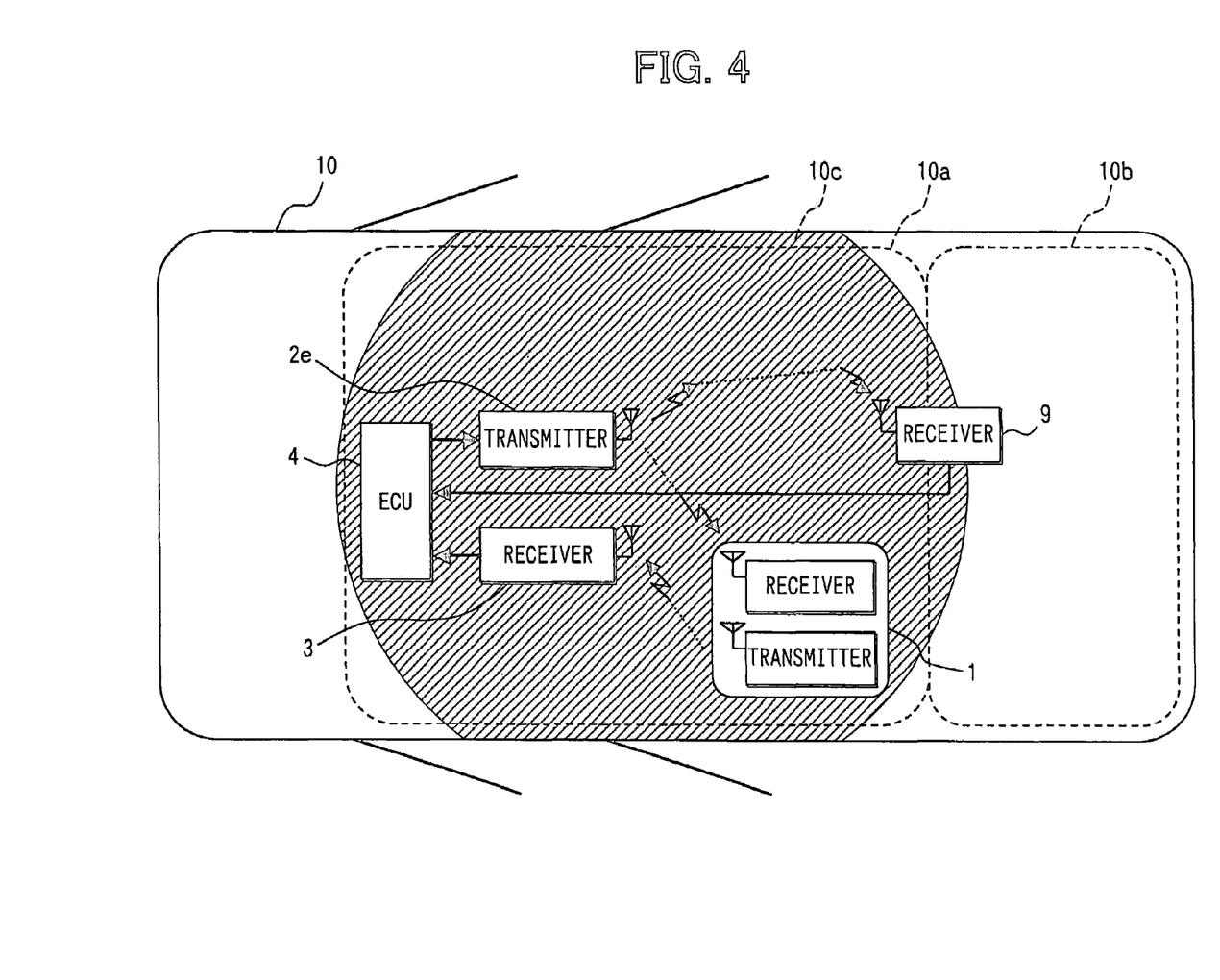
FIG. 4 is a schematic view illustrating a state of a proper detection area inside the vehicle established by the LF transmitter in the first embodiment.
Figure 5:
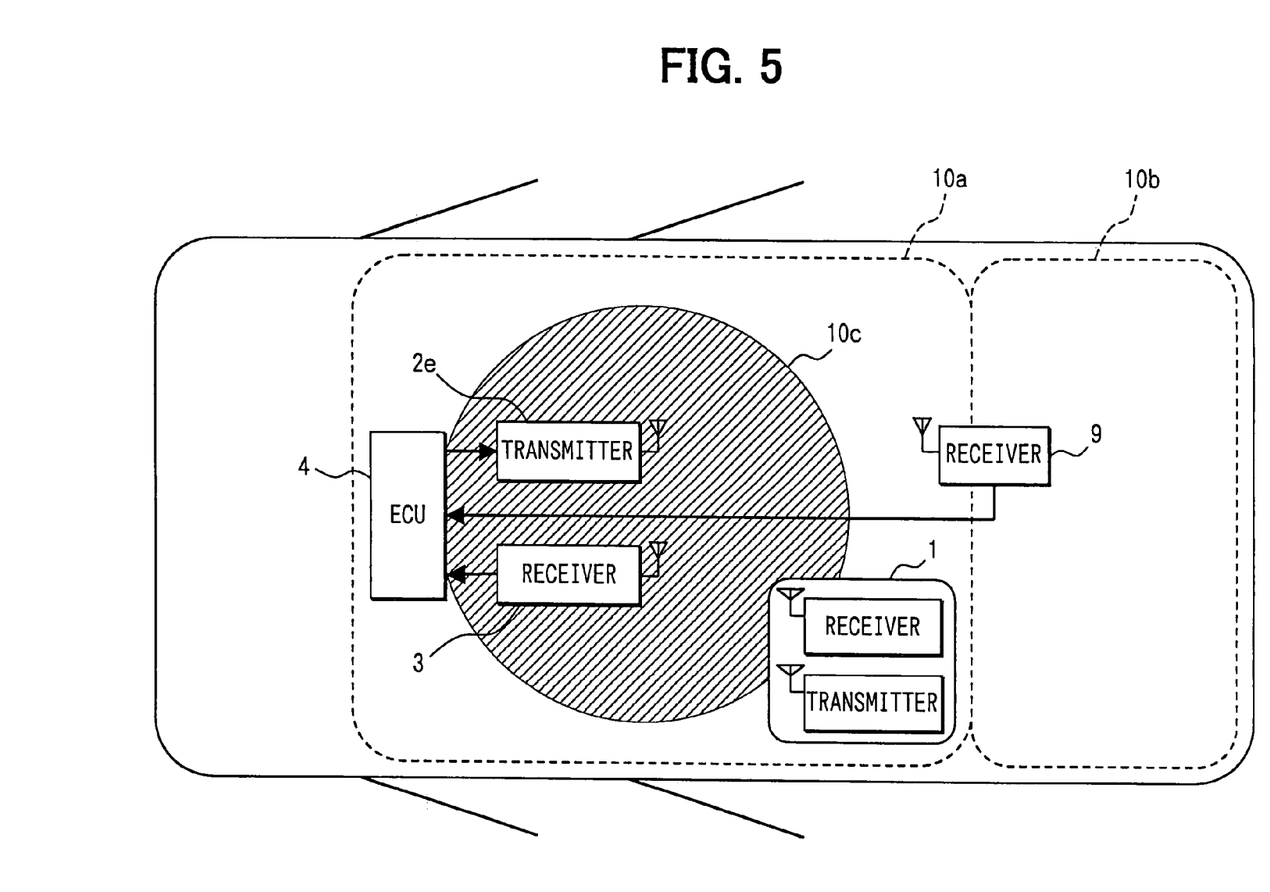
FIG. 5 is a schematic view illustrating a state of a too small detection area inside the vehicle in the first embodiment.
Figure 6:
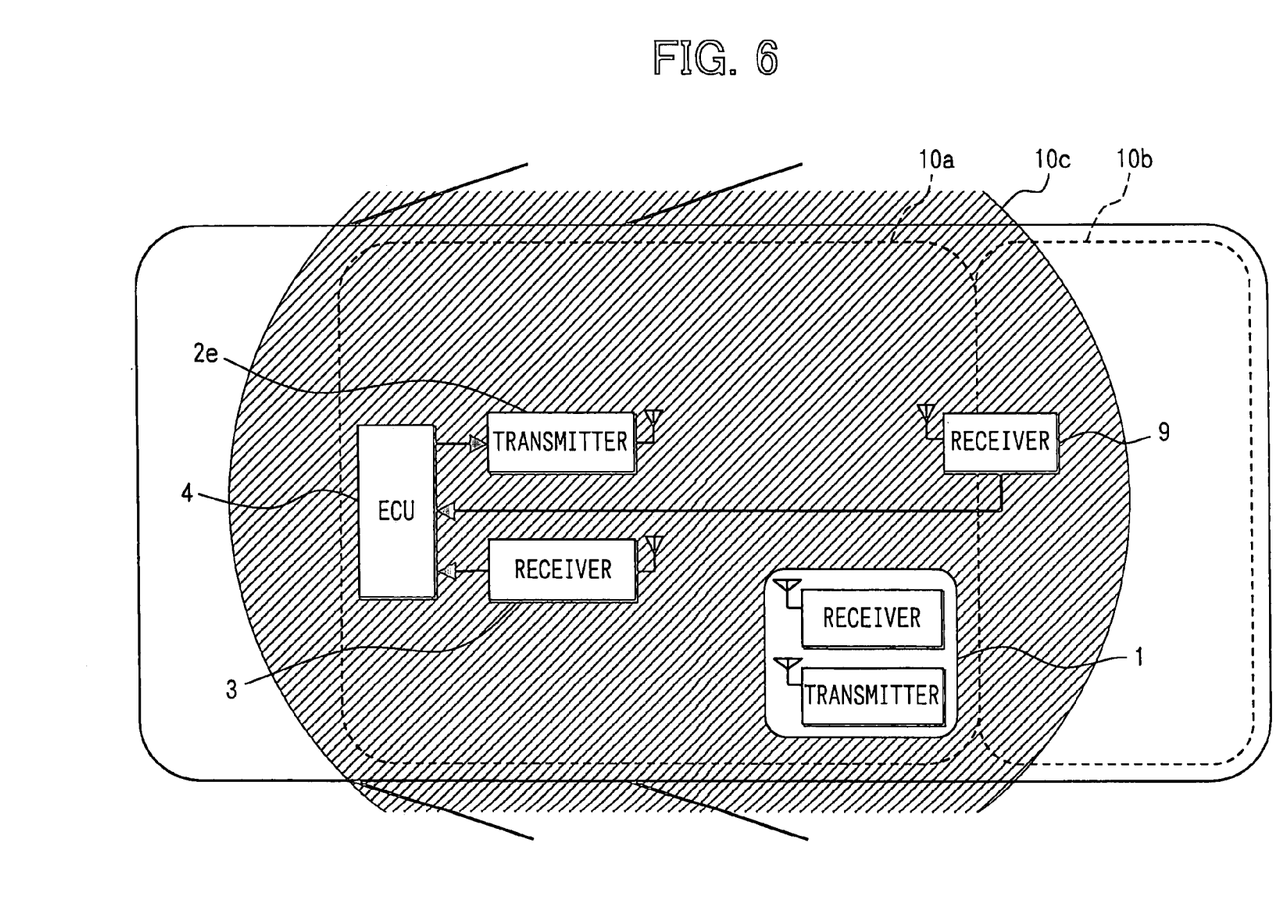
FIG. 6 is a schematic view illustrating a state of a too large detection area inside the vehicle in the first embodiment.

FIG. 4 illustrates a state of a proper detection area inside the vehicle, FIG. 5 illustrates a state of a too small detection area inside the vehicle, and FIG. 6 illustrates a state of a too large detection area inside the vehicle. In those figures, 10a, 10b and 10c designate a compartment, a rear trunk (luggage space) and a detection area (hatched), respectively.

Referring to FIG. 5, when the detection area 10c in the compartment 10a is too small, the portable device 1 cannot often receive the request signal from the interior LF transmitter 2e even if the portable device 1 is brought into the compartment. In this case, the steering lock of the vehicle is not reset or the engine cannot be started even if the engine switch is operated. Conversely, when the detection area 10c in the compartment 10a is too large covering even the exterior of the compartment as shown in FIG. 6, it often happens that the doors cannot be locked even if the user holding the portable device 1 gets off the vehicle and tries to lock the doors. It is therefore important that the detection area 10c of the interior transmitter 2e is adjusted to a proper transmission state with respect to the output level or detection area 10 at all times as shown in FIG. 4.

In this embodiment as shown in FIG. 4, the reference LF receiver 9 is so provided as to be correspond to the outer edge position when the detection area 10c has a proper expansion in the compartment 10a. Therefore, the output level of the interior LF transmitter 2e is gradually increased up to a level at which it can be received by the reference LF receiver 9 so as to properly adjust the expansion of the detection area 10c in the compartment 10a with ease.

In this embodiment, the reference LF receiver 9 equipped with the antenna and the signal-receiving circuit is disposed at the outer edge position of the detection area 10c, making it possible to property detect the signal-receiving level at the outer edge position. For example, it is possible to set up the antenna only at the outer edge position and incorporate the signal-receiver circuit in the electronic key ECU 4. In this case, however, the connection line connecting the antenna to the signal-receiving circuit becomes long, and the signals received by the antenna tend to be affected by noise. On the other hand, if the receiver equipped with the antenna and the signal-receiver circuit is set up at the outer edge position of the detection area 10c, the receiver executes the processing such as amplification and demodulation so as to be affected little by noise.

It is desired that the reference LF receiver 9 is disposed exactly at the outer edge position of the detection area in the compartment, but may be disposed at the vicinity thereof. In this case, if the reference LF receiver 9 is positioned outside the proper detection area, the output level of the interior LF transmitter 2e may be adjusted to a level which is the highest in a range in which it cannot be received by the reference LF receiver 9. Conversely, if the reference LF receiver 9 is positioned inside the outer edge position of the detection area, the output level of the interior LF transmitter 2e may be adjusted to a level slightly higher than the smallest output level in a range in which it can be received by the reference LF receiver 9.

Figure 3:
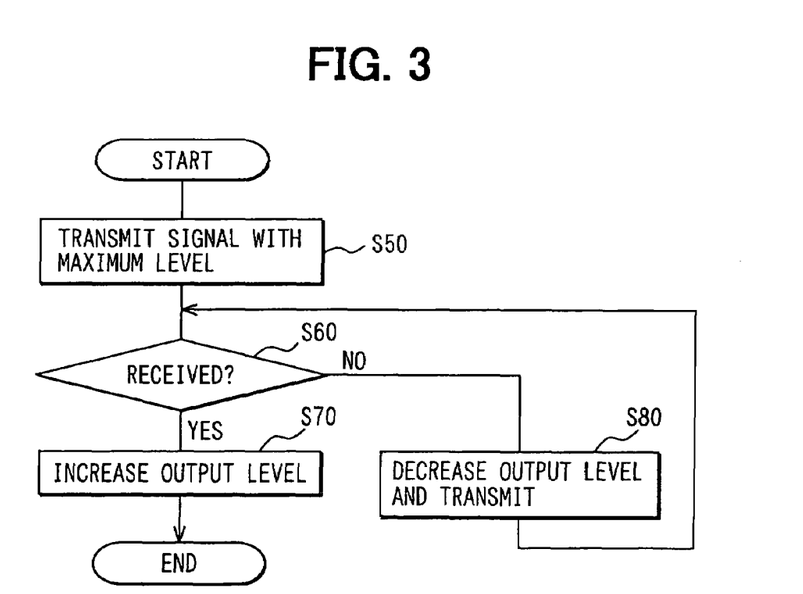
FIG. 3 is a flowchart illustrating another method of adjusting the signal transmission output of the LF transmitter in the first embodiment.

The method of adjusting the signal transmission output of the interior transmitter 2e is not limited to the above method only, but may be the one illustrated in the flowchart of FIG. 3. According to the adjusting method shown in FIG. 3, a signal is transmitted by maximizing the signal transmission level of the interior transmitter 2e at step S50 contrary to the method of FIG. 2.

At step S60, the state of receiving the signal by the reference LF receiver 9 is determined. Namely, the reference LF receiver 9 determines if a signal transmitted from the interior LF transmitter 2e is received. When it is determined that the signal is received, the routine proceeds to step S80 where the level of the signal transmission output of the interior LF transmitter 2e is decreased by one step, and a signal is transmitted from the interior LF transmitter 2e at the output level that is decreased down by one step. Thus, when the signal transmission output of the interior LF transmitter 2e is decreased and when it is determined at step S60 that no signal is received by the reference LF receiver 9, the routine proceeds to step S70 where the level of the signal transmission output of the interior LF transmitter 2e is increased by one step and is fixed. This method, too, makes it possible to adjust the signal transmission output of the interior LF transmitter 2e so that the detection area assumes a proper expansion in the compartment.

Second Embodiment

Figure 7:
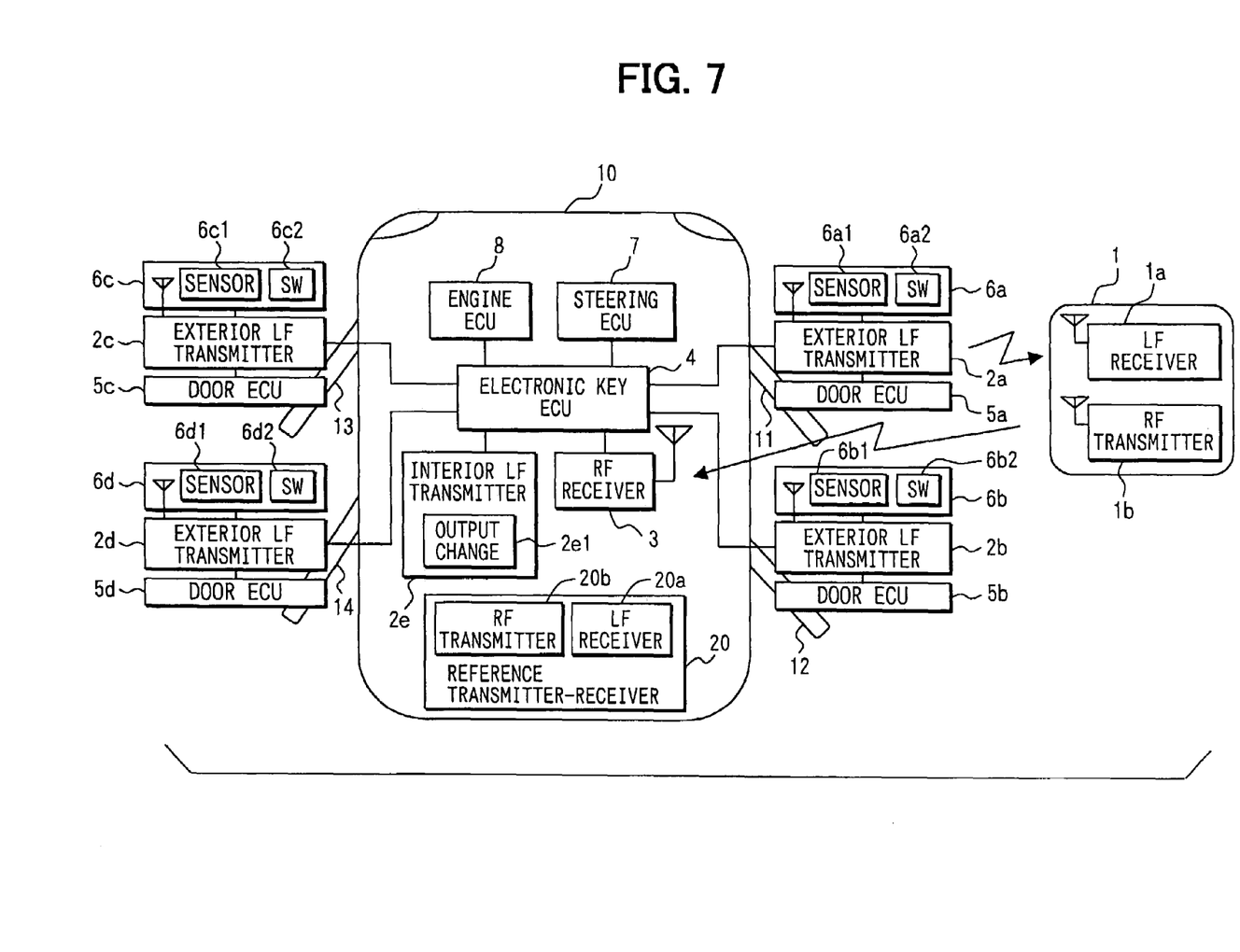
FIG. 7 is a block diagram illustrating an electronic key system according to a second embodiment of the present invention.

In this embodiment, as shown in FIG. 7, a reference transmitter-receiver 20 is provided at the same position.

The reference transmitter-receiver 20 includes an LF receiver unit 20a and an RF transmitter unit 20b, and transmits the receiving state from the RF transmitter unit 20b upon receipt of a signal from the interior LF transmitter 2e. The signal transmitted from the RF transmission unit 20b is received by the RF receiver 3 in the vehicle-mounted unit.

As described above, use of the reference transmitter-receiver 20 in place of the reference LF receiver 9 requires no wiring to the reference transmitter-receiver 20, facilitating the installation on the vehicle 10 and offering an increased degree of freedom concerning the position of installation.

The present invention should not be limited to the above embodiments but may be implemented in many other ways.

What is claimed is:

1. A remote control system for vehicle-mounted equipment comprising:
    a portable device which receives a request signal and transmits a response signal in response to the request signal;
    a vehicle-side unit mounted on a vehicle and including a transmitter for transmitting the response signal into a compartment of the vehicle, a receiver for receiving the predetermined signal from the portable device, and control means for controlling operation of vehicle-mounted equipment when the response signal is received;
    a reference receiver mounted in the vehicle and receiving a signal transmitted from the transmitter; and
    output adjusting means for adjusting a signal transmission output of the transmitter based upon a result of reception of the signal by the reference receiver.

2. The remote control system according to claim 1, wherein the reference receiver is mounted at a position near an outer edge of a desired detection area established by the transmitter.

3. The remote control system according to claim 2, wherein the output adjusting means varies stepwise the signal transmission output of the transmitter, and determines the signal transmission output of the transmitter based on the signal transmission output at the time of a signal reception state change between a reception impossible state and a reception possible state.

4. A remote control system for vehicle-mounted equipment comprising:
    a portable device which receives a request signal and transmits a response signal in response to the request signal;
    a vehicle-side unit mounted on a vehicle and including a transmitter for transmitting the request signal into a compartment of the vehicle, a receiver for receiving a response signal from the portable device, and control means for controlling the operation of the vehicle-mounted equipment when the response signal is received;
    a reference transmitter-receiver mounted in the vehicle, receives a signal transmitted from the transmitter and transmits a predetermined return signal when the signal is received; and
    output adjusting means for adjusting a signal transmission output of the transmitter based upon the return signal from the reference transmitter-receiver.

5. The remote control system according to claim 4, wherein the reference transmitter-receiver is installed at a position near an outer edge of a desired detection area in the compartment.

6. The remote control system according to claim 5, wherein the output adjusting means recognizes the signal transmission output at the time of a signal reception state change between a reception impossible state and a reception possible state upon a presence of the return signal from the reference transmitter-receiver when the signal transmission output of the transmitter-transmitter is varied stepwise, and determines the signal transmission output of the transmitter based upon the recognized signal transmission output.

7. A remote control method for a vehicle comprising:
    transmitting a request signal from a transmitter provided in a vehicle into a compartment of the vehicle to be received by a portable device carried by a user;
    allowing the user to operate the vehicle when a response signal is received from the portable device in response to the request signal;
    transmitting a predetermined signal from the transmitter into the compartment to be received by a reference receiver provided in the vehicle; and
    changing a signal output level of the transmitter based on a state of reception of the predetermined signal by the reference receiver so that the signal output level of the transmitter is adjusted to generally correspond to the compartment of the vehicle.

8. The remote control method according to claim 7, wherein the transmitting of the predetermined signal and the changing of the signal output level are performed after the user stopped operating the vehicle.

9. The remote control method according to claim 7, wherein the predetermined signal is received by the reference receiver at generally an outermost position of the compartment.

10. The remote control method according to claim 8, wherein the transmitting of the predetermined signal is started from one of a maximum output level and a minimum output level.

* * * * *